United States Patent
Kuraoka et al.

(10) Patent No.: US 8,140,562 B1
(45) Date of Patent: Mar. 20, 2012

(54) METHOD AND SYSTEM FOR DISPLAYING REAL TIME TRENDS

(75) Inventors: Hiroshi Kuraoka, Tokyo (JP); Takayuki Tei, Campbell, CA (US)

(73) Assignee: Google Inc., Mountain View, CA (US)

( * ) Notice: Subject to any disclaimer, the term of this patent is extended or adjusted under 35 U.S.C. 154(b) by 190 days.

(21) Appl. No.: 12/409,849

(22) Filed: Mar. 24, 2009

Related U.S. Application Data

(60) Provisional application No. 61/039,006, filed on Mar. 24, 2008.

(51) Int. Cl.
*G06F 17/30* (2006.01)

(52) U.S. Cl. ....................................... 707/767

(58) Field of Classification Search ............... 707/736, 707/767
See application file for complete search history.

(56) References Cited

U.S. PATENT DOCUMENTS

| | | | |
|---|---|---|---|
| 6,640,218 B1 * | 10/2003 | Golding et al. | 707/999.003 |
| 6,701,309 B1 * | 3/2004 | Beeferman et al. | 1/1 |
| 2002/0083039 A1 * | 6/2002 | Ferrari et al. | 707/1 |
| 2006/0248068 A1 * | 11/2006 | Chien et al. | 707/4 |
| 2007/0214131 A1 * | 9/2007 | Cucerzan et al. | 707/5 |
| 2008/0104045 A1 * | 5/2008 | Cohen et al. | 707/4 |
| 2008/0154877 A1 * | 6/2008 | Joshi et al. | 707/5 |
| 2009/0077047 A1 * | 3/2009 | Cooper et al. | 707/4 |

* cited by examiner

*Primary Examiner* — James Trujillo
*Assistant Examiner* — Jorge A Casanova
(74) *Attorney, Agent, or Firm* — King & Spalding LLP

(57) ABSTRACT

Displaying an information product that includes exceptional search queries to a user can include receiving search queries, measuring the frequencies of search queries received, determining the search queries whose frequencies are rising in the most relevant manner, and then displaying these exceptional queries on a user interface. The user then can select one of the displayed exceptional queries, and then the system can provide search results corresponding with the exceptional queries. The activity of a particular query can be based on the frequency of the search query's reception over a given period of time, whether in relation to an expected frequency level or the rate of change of the frequency level. Additionally, the relevant periods of time over which activity is measured can be relatively short to maximize their relevance at a given instant.

22 Claims, 6 Drawing Sheets

Search query information
200

- Canonicalized form of search query
- Language
- Country
- Count score
- Activity score

Figure 2

METHOD AND SYSTEM FOR DISPLAYING REAL TIME TRENDS

RELATED APPLICATION

This application claims priority under 35 U.S.C. 119(e) to U.S. Provisional Patent Application No. 61/039,006 filed Mar. 24, 2008.

TECHNICAL FIELD

The invention relates to displaying exceptional search queries to users. In particular, the invention relates to determining which search queries have the most relevant rising frequencies of occurrence, and displaying a list of the queries with the rising frequencies to a user.

BACKGROUND

Searching the Internet for specific information has been an essential task since the advent of the Internet. More recently, some websites providing search functionality have begun tracking popular search terms as an effort to advise users of trends in news or events. However, displaying the most popular search terms often fails to identify true trends. Rather, the most popular search terms are often insensitive to current events or news, and instead relate to common, everyday interests.

A need in the art therefore exists for displaying to users search terms that are more indicative of trends and current, significant events rather than total popularity. An additional need in the art exists for updating the list of search terms frequently—in relatively real time—to guide users towards the search terms most relevant to topical concerns.

SUMMARY OF THE INVENTION

The invention described herein can provide methods and systems for receiving search queries, measuring the frequencies of search queries received, determining the search queries whose frequencies are rising the most, and displaying these "exceptional" or unusually "hot" queries to a user. The user then can select one of the displayed exceptional queries, and then be provided with search results corresponding with the exceptional queries.

For purposes of the description below, in accordance with an aspect of the present invention, an Internet query is deemed "exceptional" upon actual measured activity associated with the query satisfying a preselected threshold of user query activity in a given time frame. The threshold may be a function of a prediction of behavior for the query in that given time frame, based, for example, on past behavior. The threshold could also, in a related aspect of the present invention, be a function of the degree to which the predicted activity of the query in that time frame is exceeded by the actual activity in the same time frame. Exceptionality may also involve comparison against an "absolute threshold", i.e., a threshold of absolute activity, e.g., in a given geographic area, so that queries that are exceptional in terms of being unexpected are not captured if, in absolute terms, the query would fail to register with a set of users having minimally acceptable size.

In one aspect, a user interface displays an information product including exceptional queries to a user. The user interface can include a display that shows a list of exceptional queries to the user. The relative activity of the search queries can be determined based upon short time intervals, such as periods of thirty, fifteen, five minutes or one minute in length. Measuring activity of search query within a time period of thirty or fewer minutes can be particularly important in capturing relevant trends in search queries. Many types of events may trigger a sudden—and perhaps short-lived—spike in search queries. For example, if a television program has a special event or guest performer, then there may be a sudden spike in search queries relating to that television program for the duration of the program, which may be about thirty minutes. Other events that may trigger a sudden, short-lived spike in search queries can include, without limitation, weather events passing through a region or country, which may rapidly move through an area, thereby triggering a spike in search queries. Thus, by providing a list of exceptional search queries that is updated in relatively short time periods, e.g., of a half hour or less, or in real time, the users can view time-relevant trends in searches via the user interface.

In another aspect, the user interface can be operated to display a short list of exceptional search queries only when the search queries are truly exceptional, according to a preselected criterion. For example, the list can include a relatively small number of exceptional queries (i.e., those that exceed a threshold over and above predicted values of activity), or can even be empty if no particular query meets defined criteria to qualify as exceptional, or unexpectedly active or hot. Displaying only those queries that are exceptional can draw more attention to these exceptional queries when they are displayed to the user.

In another aspect, the user interface can allow the user to select one of the displayed exceptional queries, and then the user interface can display search results corresponding with the selected query to the user. Such a user interface can be particularly useful for users accessing the interface via a mobile or handheld Internet device, as these devices tend to have relatively small screens and more cumbersome input methods. By providing only a short list of exceptional queries only when those queries are most exceptional and relevant, according to one or more criteria, the small display of the mobile Internet device provides a method for improved mobile access to real time trend information. This advantageous aspect of the present invention is further enhanced in that the display of the mobile device is not cluttered with unhelpful information. Additionally, by providing relevant exceptional queries which the user can select to receive search results, the users may avoid having to use the cumbersome input method of the mobile Internet device to input a query. The user interface also can allow the user to customize certain elements of the display, such as how many exceptional queries to display, to create a separate module to display the exceptional queries, and to set the criteria for determining whether an exceptional query will be displayed to the user.

In another aspect, one or more information storage units in communication with each other store information relating to all search queries received over a given period of time. The information processing unit or units can include a database. Optionally, the database can store search queries in a canonicalized—or standardized—form. For example, the canonicalized form may not be sensitive to the particular capitalization, punctuation, and/or spacing within a given search query. The database also can store information identifying the country of origin for each search query. Additionally, the database can store a given search query's "count history," or the frequency with which the search query has been received.

In another aspect, one or more information processing units in communication with each other, as well as the information storage units and the user interface, determine the frequencies of search queries and can identify exceptional queries that the user interface can display to the user. The information processing unit or units can include a server for receiving and processing the search query information stored in the database, and for serving the search query information to the user interface. The server can combine various related search queries to provide more accurate and useful search query information. For example, the server can combine records for equivalent search queries stored in the database that are in different languages. Such functionality may be particularly significant in regions or countries where multiple writing systems are used, such as Japan, which uses Hiragana and Katakana systems, as well as Kanji characters and western alphanumeric characters. The server also can process the search query information to combine search query information for misspelled versions of a search query with the information for the correctly-spelled version. Additionally, the server can process the search query information stored in the database to filter out inappropriate terms, such as those relating to explicit or inappropriate material.

In another aspect, a mobile device for displaying query information to a user and for receiving requests from the user regarding query information can include a user interface for data entry, the user interface including at least a display; and processing capacity for allowing receipt of data from the user interface, transmission of instructions to the user interface, communication with at least one server handling search queries and serving responses to queries, and communication with at least one server generating sets of exceptional queries. The mobile device can allow for the use of the processing capacity to receive over a network a set of exceptional queries, the exceptional queries being queries that have been selected, prior to receipt over the network by the mobile device, according to at least one preselected criterion, the set of exceptional queries including at least one query if the at least one query satisfies the at least one preselected criterion, but including zero queries if no query satisfies the at least one preselected criterion; display the at least one received exceptional query on the display of the user interface if the set includes at least one such exceptional query, but display no exceptional queries if the set includes zero queries; receive from the user interface input data from the user, the input data representing a selection of at least one of the set of exceptional queries if the set includes at least one query, or, if the set of exceptional queries includes no queries, receive no selection of queries from user; transmit over the network the selection of at least one of the set of exceptional queries; and in response to transmitting over the network the selection of at least one of the set of exceptional queries, receive from the server handling search queries search results associated with the at least one of the set of exceptional queries, and display on the display of the user interface the search results associated with the at least one of the set of exceptional queries.

In another aspect, a method for retrieving and displaying query information on a mobile device can include the steps of receiving a set of exceptional queries at the mobile device, the set of exceptional queries being queries that have been selected according to at least one preselected criterion, the set of exceptional queries including at least one query if the at least one query satisfies the at least one preselected criterion, but including zero queries if no query satisfies the at least one preselected criterion; displaying the at least one received exceptional query on a display of a user interface if the set includes at least one such exceptional query, but display no exceptional queries if the set includes zero queries; receiving from the user interface input data from a user, the input data representing a selection of at least one of the set of exceptional queries if the set includes at least one query, or, if the set of exceptional queries includes no queries, receive no selection of queries from user; transmitting to a computing device via a network the selection of at least one of the set of exceptional queries; and in response to transmitting over the network the selection of at least one of the set of exceptional queries, receiving from the computing device search results associated with the at least one of the set of exceptional queries; and displaying on the display of the user interface the search results associated with the at least one of the set of exceptional queries.

In another aspect, a process for generating an information product representing a set of zero or more most emergent Internet search queries can include establishing a threshold function for defining whether Internet search queries are rising at a preselected rate; accessing from a storage device data representing queries received substantially within a preselected time frame, and substantially ranked according to a measure of the frequency of the queries within the preselected time frame; and measuring the data representing the queries against the threshold function and if the data surpass the threshold function, making the data available in a physical storage medium for retrieval as the information product representing the set of most emergent Internet search queries, for storage in physical storage medium and adapted for use in tangible applications.

In another aspect, a system for generating an information product representing a set of most emergent Internet search queries can include one or more servers to access Internet query data and to generate a set of zero or more emergent Internet queries; the configuration of the one or more servers to generate the set of emergent Internet queries comprising applying functionality for thresholding the Internet query data generating to yield a set of zero or more most emergent queries; and client devices activatable by a user to retrieve the set of zero or more emergent queries and perform at least one of the steps of storing the set of zero or more emergent queries in a physical storage medium, and/or display the set of zero or more emergent queries, for use in tangible applications.

In another aspect, a computer program product including a computer readable medium having computer readable program code embodied therein for retrieving and outputting query information on a mobile device can include computer executable program code for receiving at least one criterion for determining whether a search query includes an exceptional query; computer executable program code for receiving search queries; computer executable program code for determining whether at least one search query in the received search queries includes an exceptional query, the determination being based on the at least one criterion; and computer executable program code for outputting the at least one exceptional query.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 2 is a block diagram depicting a search query information record stored in a database, according to an exemplary embodiment.

DETAILED DESCRIPTION OF THE EXEMPLARY EMBODIMENTS

The invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Figure 1:
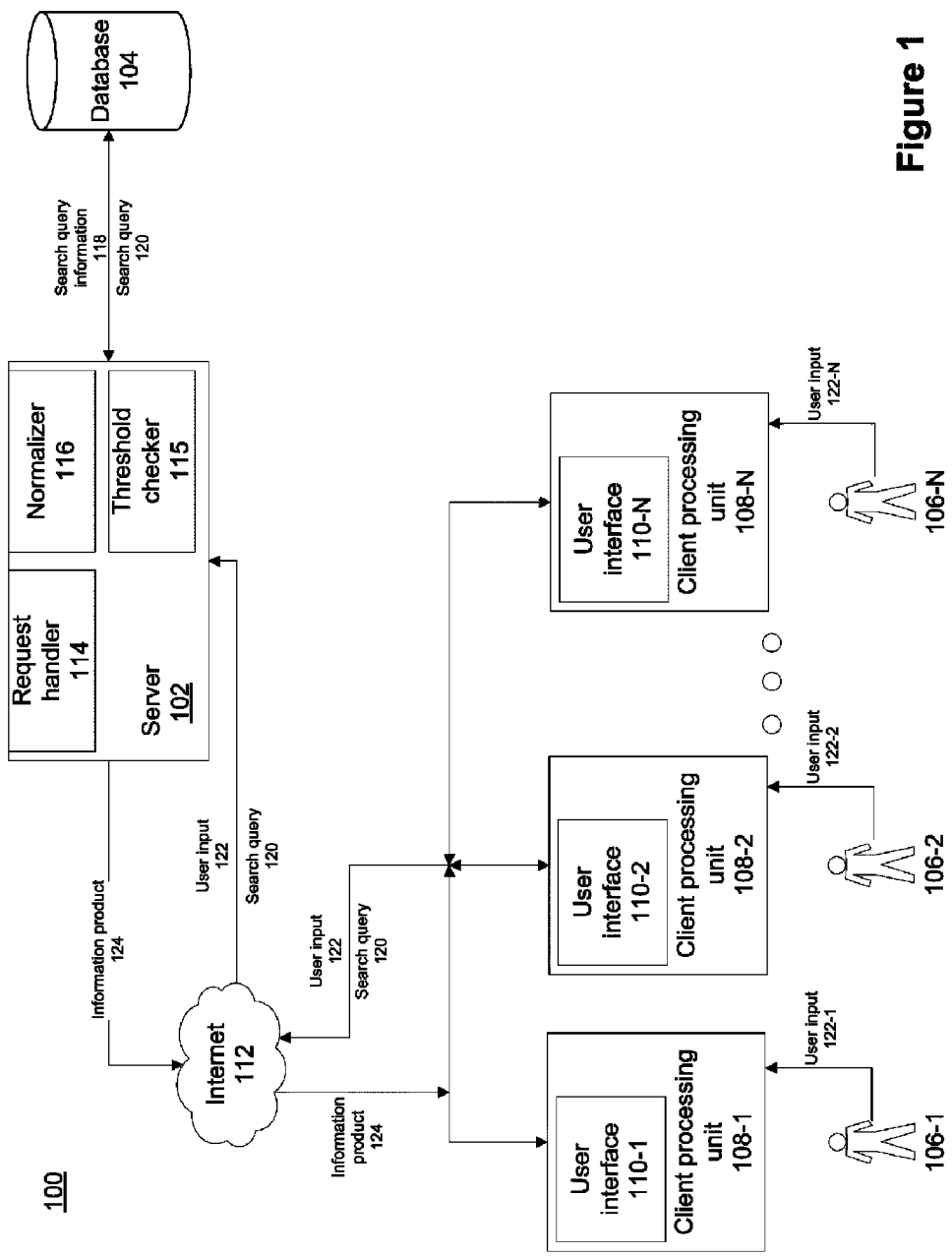
FIG. 1 is a block diagram depicting a system for displaying exceptional search queries to users, according to an exemplary embodiment.
Figure 3:
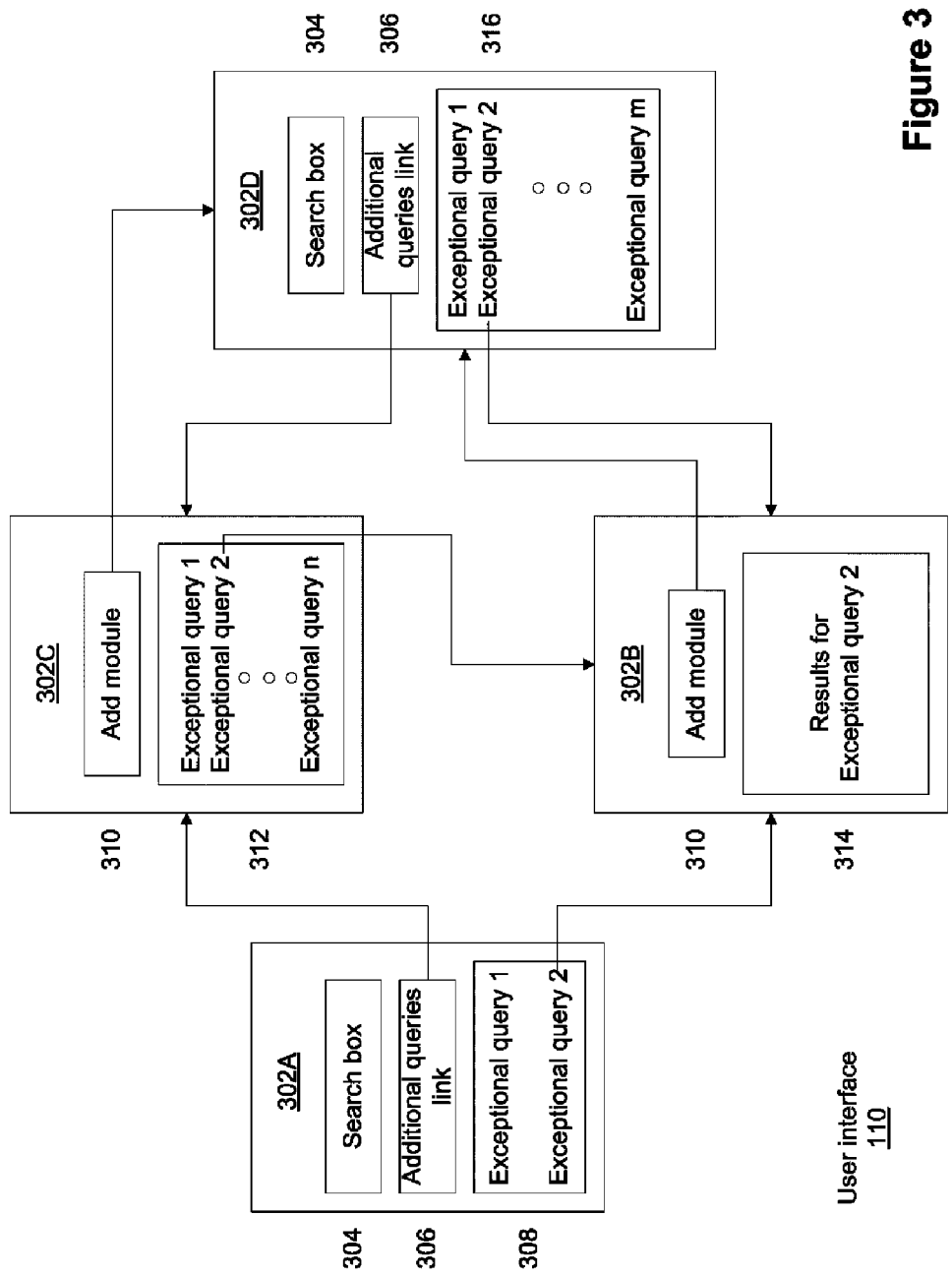
FIG. 3 is a block diagram depicting the flow of a user interface, according to an exemplary embodiment.

A method and system for displaying an information product comprising exceptional search queries to users will now be described with reference to FIGS. 1-6, which depict representative or illustrative embodiments of the invention. FIGS. 1-3 are block diagrams depicting components of a system for displaying exceptional search queries to users 106, according to an exemplary embodiment. FIG. 1 is a block diagram depicting a system 100 for displaying exceptional search queries to users 106, according to an exemplary embodiment. The exemplary system 100 includes a database 104 in communication with a server 102. The server 102 can include three subcomponents: a normalizer 116, a request handler 114, and a threshold checker 115 for processing data and input 122 from the database 104 and from users 106.

Users 106 can interact with the server 102 via a client processing unit 108 with a user interface 110. In various exemplary embodiments, the client processing unit 108 can be a mobile or handheld Internet device, a desktop computer, or a laptop computer. The client processing units 108 and the server 102 can communicate via a network such as the Internet 112, the mobile web, a local area network (LAN), or a wide area network (WAN).

Interaction between the users 106 and the server 102 can include entering search queries 120 and other user input 122 into the user interface 110, which are then received by the server 102 and stored in the database 104. The database 104 can store historical search queries and related information, and then provide this information to the server 102, which processes the data to generate an information product 124 eventually provided to the users 106. The information product 124 can include a list of exceptional queries.

The threshold checker 115 and the normalizer 116 of the server 102 can be used to process the historical search queries and related information. The threshold checker 115 can compare the historical search queries to a threshold function to determine whether a search query is sufficiently exceptional to include in the list of exceptional search queries. The normalizer 116 can then combine search query information for similar search queries and filter unwanted search queries from the list of exceptional search queries to generate a final list of exceptional search queries for the information product 124. The request handler 114 can then transmit the information product 124, which includes the final list of exceptional search queries, from the server 102 to the client processing unit 108 associated with the user 106.

Although in this exemplary embodiment, the system includes one server 102 having the normalizer 116, the request handler 114, and the threshold checker 115, multiple servers (not shown) can be included in the system 100 and each subcomponent can be included with separate servers or combined in various arrangements in the multiple servers without departing from the scope and spirit of the invention. For example, the normalizer 116 and threshold checker 115 can be stored on and executed by a first server while the request handler 114 is stored on and executed by a second server that can also render the user interface 110 to the client processing units 108. In this exemplary embodiment, the request handler 114 of the second server can receive the search query 120 and user input 122 from the client processing units 108 and forward this information to the first server for processing. The first server can then forward the information product 124 to the request handler 114 of the second server for sending to the client processing units 108. Each of the servers can be in communication with one another directly or via a network.

FIG. 2 is a block diagram depicting a search query information 118 record 200 stored in a database 104, according to an exemplary embodiment. The search query information 118 stored in the database 104 can include a variety of information, relating to a given search query 120. Exemplary information stored in a search query information 118 record 200 can include a canonicalized form of the search query 120, the language in which the search query 120 was inputted and received by the server 102, the country or countries from which the search query 120 was inputted, a count score for the search query 120, and an activity score for the search query 120. The count score can represent the number of times a given search query 120 was received by the server 102, and the activity score can represent how exceptional the given search query 120 is.

FIG. 3 is a block diagram depicting the flow of a user interface 110, according to an exemplary embodiment. The exemplary user interface 110 includes four states. These states can include an initial state 302A, a result state 302B, an additional exceptional queries state 302C, and a modified initial state 302D. In each of the four different states, the user interface 110 displays a variety of information and interfaces, including a search box 304, an additional exceptional queries link 306, a short list of exceptional queries 308, a longer list of exceptional queries 312, an exceptional queries module 316, a list of search results 314, and/or a module addition link 310.

The parties and structure depicted in FIGS. 1-3 will be discussed in more detail with reference to the methods illustrated in FIGS. 4-5.

Figure 4:
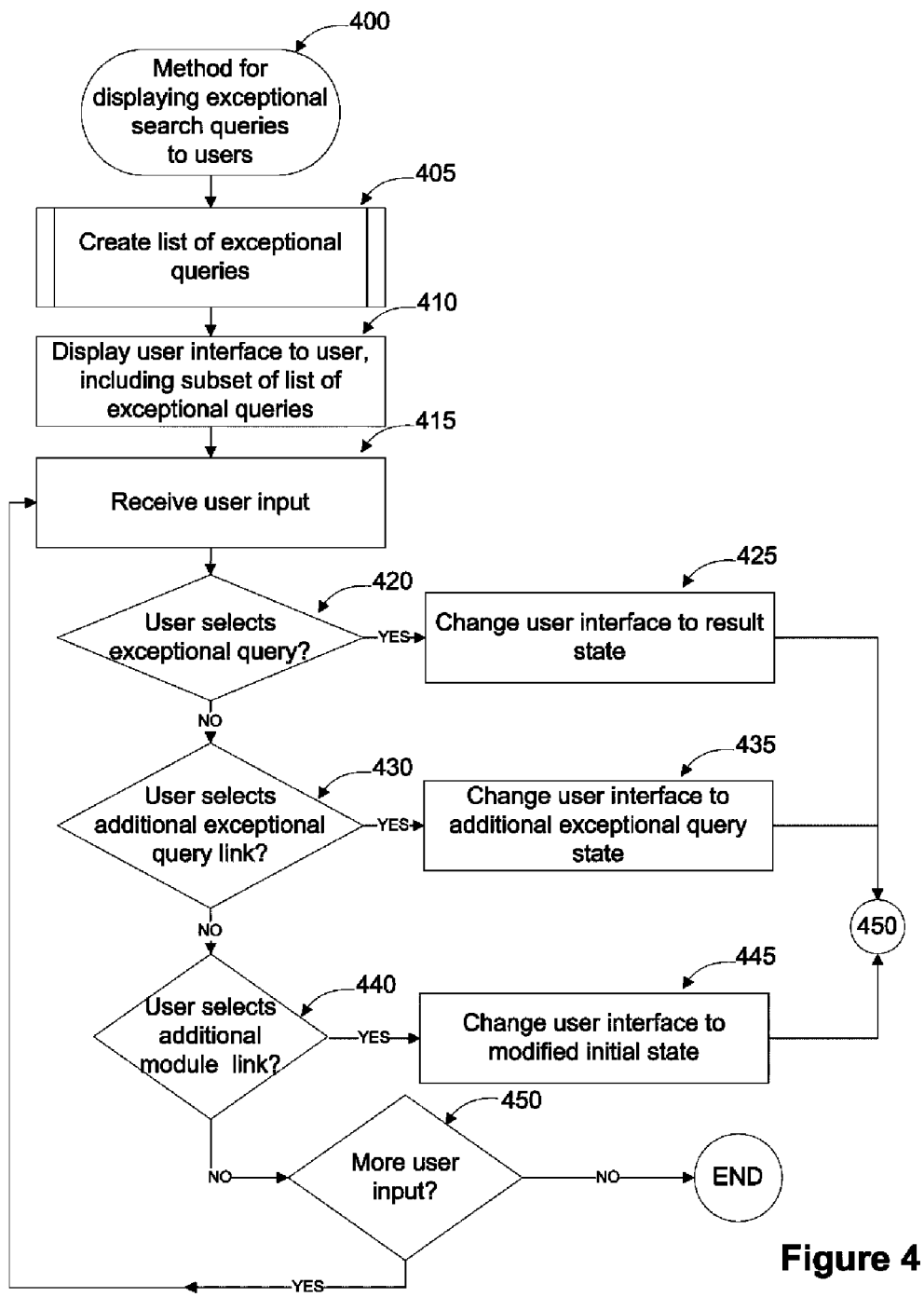
FIG. 4 is a flow chart depicting a method for displaying exceptional search queries to users, according to an exemplary embodiment.

FIG. 4 is a flow chart depicting a method 400 for displaying exceptional search queries to users 106, according to an exemplary embodiment. The method 400 will be described with reference to FIGS. 1-5.

In step 405, a list of exceptional queries is created. In an exemplary embodiment, the list of exceptional queries can be created, at least in part, by an information processing unit, such as a server 102. The server 102 can receive information relating to stored search queries from an information storage unit, such as a database 104. An exemplary method 405 of creating the list of exceptional queries is depicted in FIG. 5.

Figure 5:
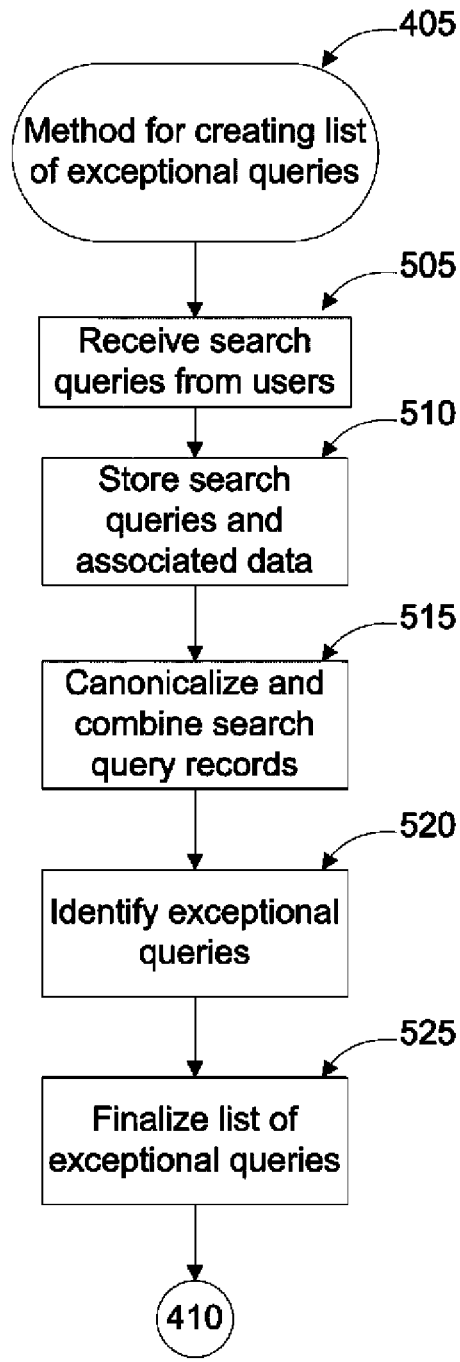
FIG. 5 is a flow chart depicting a method for creating a list of exceptional search queries, according to an exemplary embodiment.

In step 505 of FIG. 5, the server 102 receives search queries from a plurality of users 106. In an exemplary embodiment, as shown in FIG. 1, the plurality of users 106 can use client processing units 108 having a user interface 110 to input a search query 120. In various exemplary embodiments, the client processing unit 108 can be a mobile or handheld Internet device, a desktop computer, or a laptop computer. In a particular exemplary embodiment, the user interface 110 can be specifically designed for a mobile Internet device, in that it can display only the most relevant information to the user 106, thereby maximizing the utility of a relatively small screen. Additionally, as described in more detail below, the user interface 110 can be designed to receive certain input 122 from the user 106 via selections of links displayed to the user 106, rather than via a cumbersome input method such as a small keyboard or handwriting recognition.

The search query 120 received in step 505 can include a term or phrase for which the user 106 desires related information. Once the user 106 inputs the search query 120, the server 102 can receive the search query 120 over a network such as the Internet 112. The Internet 112 network can include a variety of intermediate nodes, such as an Internet Service Provider (ISP) affiliated with the user 106 and with the server 102.

In step 510, the search queries and associated data are stored in an information storage unit. In an exemplary embodiment, the information storage unit can include one or more databases 104. Such a database 104 can be in communication with the server 102, either directly or via the Internet 112 or other network, such as a LAN or WAN. In an alternative embodiment, the database 104 can be stored within the server 102 itself.

The database 104 can store a variety of additional data related to the search queries. For example, in addition to the text of the search query 120, the database 104 can store the country or region from which the search originated (i.e., the country or region in which the user input the search query 120). Additionally, the database 104 can store the time and date at which the search query 120 was received, as well as the language or writing system in which the search query 120 was entered.

In step 515, the search queries stored in the database 104 can be canonicalized and combined. In an exemplary embodiment, the server 102 or another information processing unit associated with the database 104 can canonicalize the search queries by standardizing the text of the search queries. For example, many versions of the same search query 120 can be converted to a standardized version and then the data associated with each can be combined. In combining the same search queries, the capitalization, punctuation, and/or spacing of a given search query 120 can be ignored.

In an exemplary embodiment, after the search queries have been combined, they can be stored in the database 104 as search query information 118 records 200, along with data associated with the search queries. FIG. 2 depicts an exemplary search query information 118 record 200 stored in a database 104. This exemplary search query information 118 record 200 includes fields for the canonicalized text of the search query 120 term, the languages or writing systems in which the search queries were entered, the countries or regions in which the search queries were entered, a recent count score, and an activity score. The recent count score can indicate the number of times the search query 120 was received by the server 102 or stored in the database 104.

In an exemplary embodiment, the activity score of a canonicalized search query 120 can indicate the amount of activity associated with the search query 120. In other words, the activity score can indicate the relative popularity of a search term at a given time. The relative popularity of a given search query 120—and therefore, the activity score—can be measured and calculated a variety of different ways and by considering a variety of different factors.

In one embodiment, the activity score for a given search query 120 can be determined based on the sheer volume of instances that the search query 120 was received by the server 102 or stored in the database 104 over a given time period. In other words, the activity score can be largely or solely based on the count score over a given period of time, or search frequency. Thus, commonly searched queries will generally have high activity scores. In such an embodiment, the activity scores may not be highly indicative of trends in search queries.

In another embodiment, the activity score can be determined based on a rate of increase (or decrease) of a search query's 120 frequency. Such a measure of activity can be at least somewhat indicative of trends in search queries, as high activity scores will be associated with search queries with increasing frequency (indicating an increase in the interest in the search query 120) over a given period of time, rather than merely the most common search queries generally. In mathematical terms, such a measurement based on the rate of increase can be defined as the derivative function of the search frequency with respect to time. In related embodiments, the activity score can be defined as the second, third, or n-th derivative function of the search frequency with respect to time.

In yet another embodiment, the activity score can be determined based on the deviation of the actual search frequency from a predicted search frequency for the search query 120 during a given time period. In an exemplary embodiment, search frequencies for search queries can be predicted for given time periods based upon historical search query information 118 stored in the database 104. Various algorithms or methods exist for predicting the search frequencies for search queries based upon historical search query information 118. One of ordinary skill in the art having the benefit of the present disclosure will be able to select a particular algorithm to create such a predicted search frequency for each search query 120. Such an algorithm, for example, can take into account the historical search volume for each search query 120 during various time periods. For example, a predicted search frequency for a search query 120 relating to restaurants may be relatively high during lunch time and dinner time, but relatively low during other time periods. In this embodiment, high activity scores are given to those search queries with a search frequency that exceeds the predicted search frequency over a given time period. Such a measure of activity can be indicative of trends, as well as emergence. In other words, such a measure indicates an unexpected rise in frequency.

Any of the foregoing methods of defining activity scores— or a combination of two or more such methods—can be used, as can other methods known to those of ordinary skill in the art having the benefit of the present disclosure. Each of the exemplary measures of activity described herein are at least partly affected by the time period over which the activity is measured. The length of the time period over which activity is measured can affect the relevance or significance of the trend or emergence of the search query 120. A shorter time period can result in a more "real time" measure of activity, which is often more relevant in identifying true search trends. For example, if a storm or tornado is passing through a given region, there may be a sudden spike in weather-related search queries in the region. If the activity is measured over a day-long period, then the spike in weather-related search queries may not affect the activity scores of such searches as much as if the activity is measured over a relatively short period. Relatively short time periods can include one hour, thirty minutes, fifteen minutes, ten minutes, one minute, or any other suitable time periods.

In step 520, exceptional queries are identified. Exceptional queries can be identified as those search queries that have an activity score that satisfy a threshold function, such as by exceeding a given threshold score, or otherwise passing through a filter designed to identify or separate activity scores within a given range or exceeding a certain value. In other embodiments, various other filters and criteria in addition to the activity score could be used to identify exceptional queries. In a particular embodiment, the server 102 can include a threshold checker 115 component that compares search queries to the threshold function to determine whether each search query is sufficiently exceptional.

In various embodiments, the threshold score or other filters or limiting criteria can be pre-selected by each user 106, or it can be defined in the database 104 or server 102 for all users 106. The ability to pre-select the threshold score may be of particular interest to a more sophisticated user 106, such as a commercial partner or subscriber of the system operator. Such sophisticated users may, for example, desire to define a particular threshold or modify the user interface 110 to display to its end-users (or users of the sophisticated user's customized system) the exceptional queries that are most relevant to the sophisticated user. Additionally, subscribers also may be given access to the data feed generated by the database 104 and/or server 102, and then can process and provide an information product 124 that includes a list of exceptional queries to its end users. Exemplary end users of these subscribers can include users that access the Internet 112 through a proprietary network connection maintained by the subscribers.

In an exemplary embodiment, the server 102 can identify the exceptional queries after retrieving or receiving search query information 118 from the database 104, and then create an initial list of these exceptional queries. The server 102 can receive search query information 118 from the database 104 either by the server 102 "polling" the database 104 to determine whether new search query information 118 exists or by the database 104 notifying the server 102 each time new search query information 118 has been added to the database 104.

An exemplary polling method can involve each server 102 periodically (e.g., every minute) checking the database 104 for a new update. The server 102 can remember a "signature" of the last version of the data stored in the database 104 that it read, such as by implementing a file timestamp. If a newer version is available, the server 102 can load and process the new search query information 118.

Alternatively, the database 104 can notify each server 102 when the database 104 completes storing new search query information 118. The server 102 then can load and process the new search query information 118 stored in the database 104.

Figure 6:
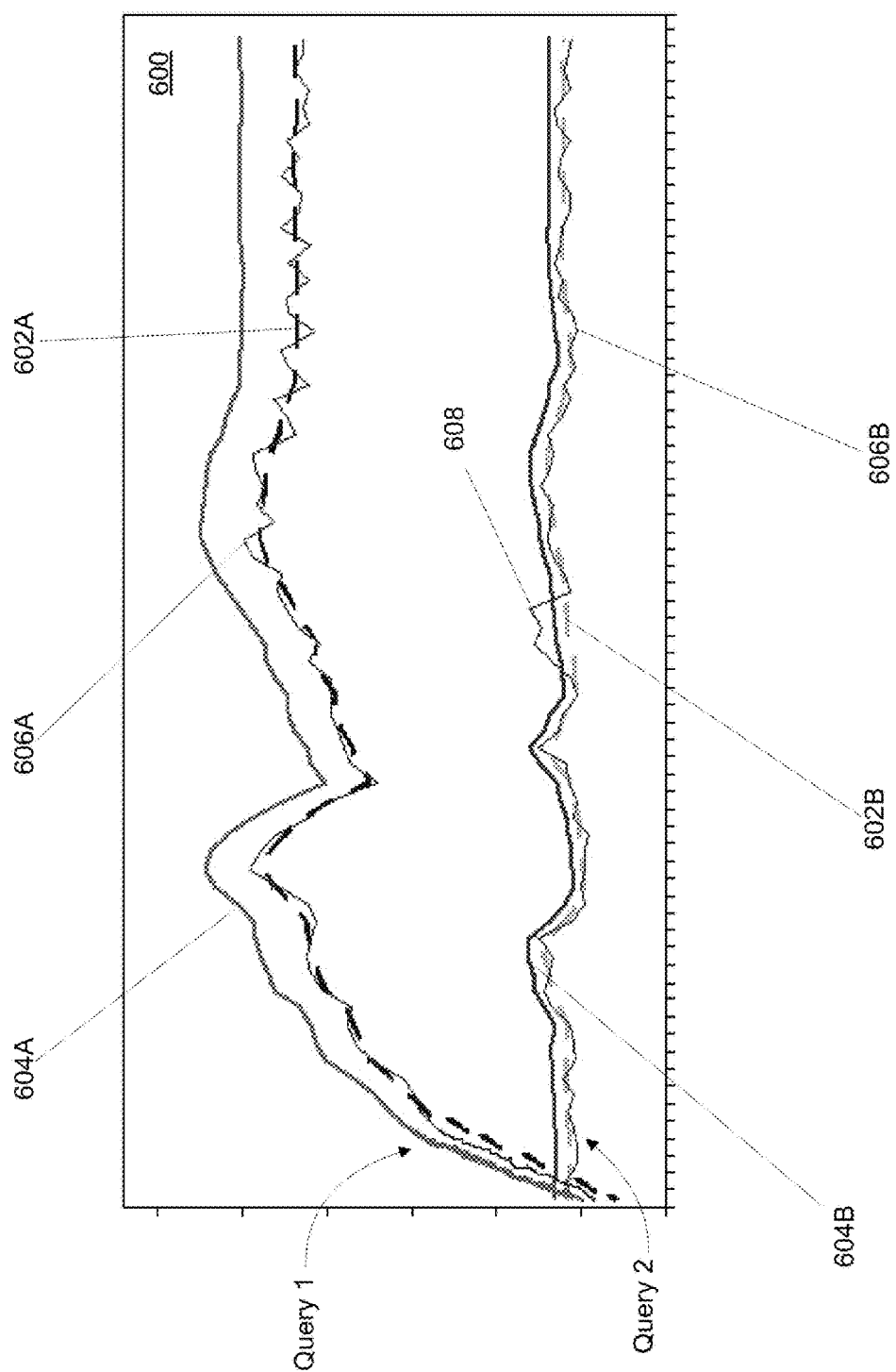
FIG. 6 is a graph depicting actual and predicted search frequencies for two search queries, according to an exemplary embodiment.

FIG. 6 is a graph 600 depicting actual and predicted search frequencies for two search queries, according to an exemplary embodiment. The graph 600 depicted in FIG. 6 helps illustrate foregoing exemplary methods of defining activating scores and identifying which search queries are exceptional queries. FIG. 6 depicts two sets of data in the form of curves on the graph 600: one set for "Query 1" and the other set for "Query 2." Queries 1 and 2 can represent any query received by the server 102 and/or stored in the database 104.

The graph 600 includes three curves for each of Queries 1 and 2. In an exemplary embodiment, the curves can represent a search volume on the Y-axis, and time intervals on the X-axis. Thus, each curve can represent search volume over time. Specifically, the Query 1 set includes a predicted frequency curve 602A, an actual frequency curve 606A, and a threshold curve 604A.

The predicted frequency curve 602A can represent the predicted search frequency of Query 1 over time. As described previously, the predicted search frequency for Query 1 can be based upon historical search frequencies and patterns for Query 1. The actual frequency curve 606A can represent the actual search frequency of Query 1 over time. Lastly, the threshold frequency curve 604A can represent a minimum deviation above the predicted frequency curve 602A that must be surpassed in actual search frequency before Query 1 would be considered sufficiently exceptional. In an exemplary embodiment, the threshold frequency curve 604A can be defined in terms of a set percentage (such as 10%) above the predicted frequency curve 602A. The graph 600 further includes corresponding curve 602B, 604B, 606B for Query 2. Moreover, although the graph 600 depicts continuous (rather than incremental) periods for each of the frequency curves, measurement of search volume can be performed either continuously or in periodic increments (such as every 30, 20, 5, or 1 minutes).

According to the hypothetical exemplary data depicted in FIG. 6, the actual frequency curve 606A for Query 1 is almost always higher than the actual frequency curve 606B for Query 2, with the exception a small portion of time at the beginning of the graph 600. Thus, in an embodiment where activity of a search query 120 is based purely on search frequency, the activity score for Query 1 would be higher than that of Query 2 for the majority of the time period shown on the graph 600. Additionally, the rate of increase in the actual frequency curve 606A for Query 1 is higher than that of the actual frequency curve 606B for Query 2 over many periods of time. Thus, in an embodiment where the activity score of a search query 120 is based on the rate of increase of the search frequency, the activity score for Query 1 would likely be higher than that of Query 2 during those time periods. Depending on the threshold value of activity scores for either of these definitions, Query 1 may or may not qualify as an exceptional query, but is more likely to do so than Query 2.

However, in embodiments where the activity score of a search query 120 is based on the actual frequency exceeding the predicted frequency by a particular threshold, Query 2 satisfies that criteria over a particular time period, while Query 1 does not. As shown in FIG. 6, the actual frequency curve 606A for Query 1 never exceeds the threshold frequency curve 604A. However, a portion 608 of the actual frequency curve 606B for Query 2 exceeds the threshold frequency curve 604B. During the time period corresponding with this portion 608, Query 2 can qualify as an exceptional query, as the actual search frequency exceeds the predicted search frequency by an amount over the threshold. In this embodiment, during other time periods, neither Query 1 nor Query 2 would qualify as an exceptional query.

In step 525, a list of exceptional queries is finalized. In an exemplary embodiment, finalizing the list of exceptional queries can include normalizing the initial list of exceptional queries formed in step 520. In an exemplary embodiment, the server 102 can include a normalizer 116 component that performs this normalization. Normalizing can include combining search query information 118 for similar search queries. For example, common misspellings of exceptional queries can be combined with the properly spelled version, as can alternative or derivative names of products or services be combined into the main product or service name. Additionally, the normalizer 116 can combine search query information 118 for equivalent search queries inputted in different languages or writing systems. After normalizing information for these exceptional queries, the activity score of the combined record 200 can be the sum of the activity scores of each non-normalized record 200. Alternatively, the activity score of the combined record 200 can be the highest individual activity score of the non-normalized records 200.

The normalizer 116 also can filter out inappropriate search queries. For example, the normalizer 116 can compare the list of exceptional queries to a list or database 104 of explicit terms and hate speech, and remove matching queries from the list. The normalizer 116 also can analyze the list of exceptional queries to determine whether any of the queries include sensitive or identifying information, such as social security numbers or telephone numbers. Such analysis can include identifying search queries with sequences of numerical characters. These search queries can be removed from the list of exceptional queries by the normalizer 116.

Additionally, users 106 can register complaints about exceptional queries that are displayed to them. In such an embodiment, the server 102 can remove an exceptional query from the list. In one embodiment, the server 102 can remove the exceptional query automatically, such as upon receipt of a certain number of complaints. Alternatively, an operator of the server 102 can review complaints to determine whether the exceptional query should be removed. Additionally, an operator of the server 102—or the server 102 automatically— can remove from the list of exceptional queries those queries with poor click-through performance.

In an exemplary embodiment, the normalizer 116 can limit the list of exceptional queries to search queries originating from a specific country or region. The specific country or region selected can be based on the preferences of the user 106 that will receive the exceptional query information, the location of the user 106, or the language of the user 106.

In an exemplary embodiment, the list of exceptional queries can be finalized after the normalizer 116 completes its processing of the list.

At the end of step 525, the method 405 of creating a list of exceptional queries ends, and thus returns to step 410 of FIG. 4. The steps described with respect to FIG. 5 identify only one exemplary method 405 of creating a list of exceptional queries. Other suitable methods known to one of ordinary skill in the art having the benefit of the present disclosure can be substituted for this exemplary method. Regardless of the particular method of creating the list of exceptional queries, the method 405 can be continuously repeated in the background to update the list, and the user interface 110 can be updated when appropriate (i.e., such as when the list of exceptional queries has changed).

In step 410, the user interface 110 is displayed to the user 106, including a subset of the list of exceptional queries 308. This subset constitutes an information product 124 created by the backend process described previously, and then provided to a user 106—in effect, a consumer of the information product 124. In an exemplary embodiment, the server 102 can process the list of exceptional queries and transmit the list of exceptional queries to the user interface 110. In a particular exemplary embodiment, this transmission can be performed by the request handler 114 component of the server 102. The request handler 114 can transmit the list of exceptional queries via a variety of methods, such as utilizing XML, HTTP, and/or RSS protocols.

The subset of the list of exceptional queries 308 that is displayed to the user 106 can be determined according to a variety of methods. In an exemplary embodiment, the list can be arranged in descending order of activity scores, and the first N-items on the list can be displayed to the user 106. The number of exceptional queries displayed to the user 106 can be defined by a user 106 preference. Alternatively, the user interface 110 can display a standard number of exceptional queries, such as the top one, two, or five. In another alternative embodiment, the displayed list of exceptional queries 308 can include only those exceptional queries that are especially exceptional or considered major and new. Those exceptional queries that are considered especially exceptional or sufficient major and new can be selected based on the exceptional score exceeding a high threshold. In such an embodiment, there may be times when no exceptional queries satisfy this criteria, and thus, the displayed list 308 can be empty.

As shown in FIG. 3, in an initial state 302A, the user interface 110 can include a search box 304 that can receive custom input 122 from the user 106, a displayed list of exceptional queries 308, and an additional exceptional queries link 306. The user interface 110 can be displayed on any client processing unit 108 compatible with the user interface 110. Exemplary client processing units 108 can include a mobile or handheld Internet device, a desktop computer, or a laptop computer. In a particular embodiment, the user interface 110 can be specifically designed for a mobile Internet device by including a limited number of fields, links, and other interfaces.

In step 415, the user interface 110 receives user input 122. In an exemplary embodiment, the user's input 122 can be received by the user interface 110 via the user's client processing unit 108. Input 122 can include entering text in the search box 304, selecting an exceptional query from the displayed list of exceptional queries 308, and/or selecting the additional exceptional queries link 306. After the user interface 110 receives the user input 122, the user input 122 can be received by the server 102 via the Internet 112 or other network. The server 102 then can communicate with the user interface 110 to update the user interface 110 accordingly.

In step 420, the user interface 110 determines whether the user selected an exceptional query from the displayed list of exceptional queries 308. If the user 106 selected an exceptional query, then the method 400 branches to step 425, where the user interface 110 can change to a result state 302B, where search results 314 for the exceptional query are displayed. Otherwise, the method 400 branches to step 430. The ability to select an exceptional query and receive corresponding search results 314 can be useful for a variety of client processing units 108, but can be particularly useful for mobile Internet devices where custom input methods such as typing may be inconvenient. Given that the displayed exceptional queries can be among the most emerging, interesting, and/or relevant search query 120 for a typical user 106 in a given region at a given time, such a user interface 110 can allow mobile Internet device users 106 to receive highly relevant and topical information with minimal effort. After step 425, the method 400 proceeds to step 450.

In step 430, the user interface 110 determines whether the user 106 selected the additional exceptional queries link 306. If so, the method 400 branches to step 435, where the user interface 110 can change to an additional exceptional queries state 302C. Otherwise, the method 400 branches to step 440. In the additional exceptional queries state 302C, a longer list of exceptional queries 312 can be displayed. In various exemplary embodiments, the longer list of exceptional queries 312 can include the top five, ten, twenty, or fifty exceptional queries, as defined previously. In an exemplary embodiment, as shown in FIG. 3, the user interface 110 in the additional exceptional queries state 302C—or any other state—can include a module addition link 310. After step 435, the method 400 proceeds to step 450.

In step 440, the user interface 110 determines whether the user 106 selected the module addition link 310. If so, the method 400 branches to step 445, where the user interface 110 can change to a modified initial state 302D, which can comprise a user-specific initial state that includes an exceptional query module 316 in addition to the standard components of the initial state 302A. In an exemplary embodiment, the modified initial state 302D also can include other modules that the user 106 has selected. In an exemplary embodiment, the exceptional queries module 316 displayed in the modified initial state 302D of the user interface 110 can include a greater number of exceptional queries—and not necessarily only major or especially exceptional queries—than those displayed in the initial state 302A. The exceptional queries in the module 316 can be selected by a user 106 in a similar manner to how the user 106 can select exceptional queries from the initial state 302A, as described previously.

In exemplary embodiments, in any of the states of the user interface 110 described herein, the user interface 110 can include a search box 304, a displayed list of exceptional queries 308, a module addition link 310, and/or an additional exceptional queries link 306. Other suitable links, fields, or interfaces known to one of ordinary skill in the art having the benefit of the present disclosure also can be added to any of the states. Additionally, regardless of the particular state of the user interface 110, the user interface 110 also can include snippets related to any exceptional queries that are displayed. The snippets can include brief descriptive information relating to the exceptional query. Alternatively, or additionally, more detailed information corresponding with the exceptional query can be provided, either within the same state or a new state, that provides an analysis of the factors leading to the exceptional query's high activity score.

In another exemplary embodiment, when the user interface 110 changes from one state to another, the user interface 110 can determine whether an updated exceptional query list is available. In yet another exemplary embodiment, the user interface 110 can periodically or continuously determine whether an updated exceptional query list is available. If an updated exceptional query list is available, then the user interface 110 can be updated accordingly.

In step 450, the method 400 determines whether the user 106 has or will enter more input 122. If so, the method 400 returns to step 415. Otherwise, the method 400 ends.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein.

The invention can be used with computer hardware and software that performs the methods and processing functions described above. As will be appreciated by those skilled in the art, the systems, methods, and procedures described herein can be embodied in a programmable computer, computer executable software, a computer program product, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc. Any of these or other types of computer readable media can be read by a variety of computer hardware components, such as those described herein. For example, computer readable media can be read by, associated with, stored on, and/or executed on the server 102 (or any of the sub-components 114, 115, 116 thereof), the client processing unit 108, the database 104 or any other suitable computer or electronic hardware that will be recognized by one of ordinary skill in the art having the benefit of the present disclosure.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

We claim:

1. A mobile device for displaying query information to a user and for receiving requests from the user regarding query information, the mobile device comprising:

a user interface on the mobile device, for data entry, the user interface comprising at least a display;

processing capacity coupled to a memory, in the mobile device, for allowing receipt of data from the user interface, transmission of instructions to the user interface, communication with at least one server handling search queries and serving responses to queries, and communication with at least one server generating sets of exceptional queries, the mobile device allowing for use of the processing capacity to:

receive, by the mobile device, over a network, a set of exceptional queries, the exceptional queries being queries that have been selected, prior to receipt over the network by the mobile device, selected according to at least one preselected criterion, and selected within a given time frame measured from receipt of at least one of the search queries at the at least one server, the search queries from which the set of exceptional queries are selected having been normalized and combined, the set of exceptional queries including at least one query that satisfies the at least one preselected criterion;

display, by the mobile device, the at least one received exceptional query on the display of the user interface;

receive, by the mobile device, from the user interface, input data from the user, the input data representing a selection of at least one of the set of exceptional queries;

transmit, by the mobile device, over the network the selection of at least one of the set of exceptional queries;

in response to transmitting, by the mobile device, over the network the selection of at least one of the set of exceptional queries:

receive, by the mobile device, from the server handling search queries search results associated with the at least one of the set of exceptional queries; and display, by the mobile device, on the display the search results associated with the at least one of the set of exceptional queries.

2. The mobile device according to claim 1, wherein the at least one preselected criterion for identifying exceptional queries comprises a degree to which a rate of receipt of user requests involving a particular query in the given time frame exceeds a predicted rate of receipt of user requests for the particular query.

3. The mobile device according to claim 1, wherein the exceptional queries are received and displayed by the mobile device within a time frame of less than or equal to one half of an hour of the occurrence of the queries prior to their selection as exceptional queries.

4. The mobile device according to claim 3, wherein the time frame comprises a time frame of less than or equal to one quarter of an hour.

5. The mobile device according to claim 4, wherein the time frame comprises a time frame of less than or equal to five minutes.

6. The mobile device according to claim 4, wherein the time frame comprises a time frame of less than or equal to one minute.

7. A method for retrieving and displaying query information on a mobile device, the method comprising the steps of:
receiving a set of exceptional queries at the mobile device, the set of exceptional queries being queries that have been selected from search queries according to at least one preselected criterion, and selected within a given time frame measured from receipt of at least one of the search queries at a server, the search queries from which the set of exceptional queries are selected having been normalized and combined, the set of exceptional queries including at least one query that satisfies the at least one preselected criterion;
displaying the at least one received exceptional query on a display of a user interface if the set includes at least one such exceptional query;
receiving from the user interface input data from a user, the input data representing a selection of at least one of the set of exceptional queries if the set includes at least one query;
transmitting to a computing device via a network the selection of at least one of the set of exceptional queries; and
in response to transmitting over the network the selection of at least one of the set of exceptional queries:
receiving from the computing device search results associated with the at least one of the set of exceptional queries; and
displaying on the display of the user interface the search results associated with the at least one of the set of exceptional queries.

8. The method according to claim 7, wherein the at least one preselected criterion for identifying exceptional queries comprises a degree to which a rate of receipt of a particular query in the given time frame exceeds a predicted rate of receipt of the particular query.

9. The method according to claim 7, wherein the exceptional queries are received and displayed by the mobile device within a time frame of less than or equal to one half of an hour of an occurrence of the queries prior to their selection as exceptional queries.

10. The method according to claim 9, wherein the time frame comprises a time frame of less than or equal to one quarter of an hour.

11. The method according to claim 10, wherein the time frame comprises a time frame of less than or equal to five minutes.

12. The method according to claim 11, wherein the time frame comprises a time frame of less than or equal to one minute.

13. The method according to claim 7, wherein the computing device comprises a server.

14. A process for generating an information product representing a set of one or more most emergent Internet search queries, the process comprising the steps of:
establishing a threshold function for defining whether Internet search queries are rising at a preselected rate;
accessing from a storage device data representing queries received substantially
(i) within a preselected time frame measured from receipt of the queries at a server, the queries having been normalized and combined, and
(ii) ranked according to a measure of the frequency of the queries within the preselected time frame; and
measuring the data representing the queries against the threshold function and if the data surpass the threshold function, making the data available in a physical storage medium for retrieval as the information product representing the set of most emergent Internet search queries, for storage in physical storage medium and adapted for use in tangible applications.

15. The process according to claim 14, wherein the data representing the queries accessed from the storage device and received substantially from the preselected time frame are also from substantially within a preselected target geographic area.

16. The process according to claim 14, wherein the data representing the queries accessed from the storage device are scaled according to the percentage of total queries that originated from within the target geographic area.

17. The process according to claim 14, further comprising, prior to the step of establishing a threshold, receiving a threshold-related input from a customer for the information product and wherein the step of establishing the threshold function for defining whether Internet search queries are rising at a preselected rate comprises setting the threshold function equal to the threshold-related input received from the customer.

18. A system for generating an information product representing one or more most emergent Internet search queries, the system comprising:
one or more servers to access Internet query data and to generate the one or more emergent Internet queries;
the one or more servers, configured to generate the one or more most emergent Internet search queries by selecting queries received at the one or more servers, the selected queries received within a given time frame measured from receipt of at least one of the selected queries at the one or more servers, generating the Internet query data by normalizing and combining the selected queries, and applying functionality for thresholding the Internet query data accessed by the one or more servers, thereby generating the one or more most emergent Internet search queries; and
a plurality of client computer devices comprising a processing unit and memory, each client computer device configured to be activatable by a user to retrieve the one or more most emergent Internet search queries from the one or more servers, and to perform at least the step of:

displaying, at least one or more of the one or more most emergent Internet search queries, the one or more most emergent Internet search queries for use in tangible applications.

19. The system according to claim 18, wherein the server receiving the search queries and the server generating sets of exceptional queries comprise the same server.

20. The system according to claim 18, wherein the server receiving the search queries and the server generating sets of exceptional queries comprise separate servers.

21. A computer program product comprising:
a computer readable medium having computer readable program code embodied therein for retrieving and outputting query information, the computer program product comprising:
computer executable program code for receiving at least one criterion for determining whether a search query comprises an exceptional query;
computer executable program code for receiving a plurality of search queries;
computer executable program code for selecting queries from the plurality of received search queries, the selected queries received within a given time frame measured from a time of receipt of at least one of the selected queries, normalizing and combining the selected queries, and identifying at least one of the selected queries in the plurality of received search queries as an exceptional query, the identification being based on the at least one criterion; and
computer executable program code for outputting the at least one exceptional query.

22. The computer program product according to claim 21, wherein the at least one criterion comprises a degree to which a rate of receipt for a particular search query in a given time frame exceeds a predicted rate of receipt for the particular search query.

* * * * *